United States Patent
Eldar et al.

(10) Patent No.: US 8,902,906 B2
(45) Date of Patent: *Dec. 2, 2014

(54) DYNAMIC NETWORK IDENTITY ARCHITECTURE

(75) Inventors: Avigdor Eldar, Jerusalem (IL); Izoslav Tchigevsky, Kiryat Haim (IL)

(73) Assignee: Intel Corporation, Santa Clara, CA (US)

(*) Notice: Subject to any disclaimer, the term of this patent is extended or adjusted under 35 U.S.C. 154(b) by 152 days.

This patent is subject to a terminal disclaimer.

(21) Appl. No.: 13/346,181

(22) Filed: Jan. 9, 2012

(65) Prior Publication Data
US 2012/0106557 A1 May 3, 2012

Related U.S. Application Data

(63) Continuation of application No. 11/316,789, filed on Dec. 22, 2005, now Pat. No. 8,145,756.

(51) Int. Cl.
*H04L 12/28* (2006.01)
*H04L 29/12* (2006.01)

(52) U.S. Cl.
CPC .... *H04L 29/12216* (2013.01); *H04L 29/12783* (2013.01); *H04L 61/2007* (2013.01); *H04L 61/35* (2013.01)
USPC ............................ 370/400; 370/352; 370/392

(58) Field of Classification Search
None
See application file for complete search history.

(56) References Cited

U.S. PATENT DOCUMENTS

| | | | |
|---|---|---|---|
| 7,546,354 B1 * | 6/2009 | Fan et al. ................... | 709/219 |
| 7,793,321 B2 * | 9/2010 | Simms et al. ................ | 725/39 |
| 8,145,756 B2 | 3/2012 | Eldar et al. | |
| 2003/0061320 A1 | 3/2003 | Grover et al. | |
| 2004/0131057 A1 | 7/2004 | Miyashita | |
| 2004/0258051 A1 | 12/2004 | Lee et al. | |
| 2004/0268113 A1 | 12/2004 | Rothman et al. | |
| 2005/0044207 A1 | 2/2005 | Goss et al. | |
| 2005/0081119 A1 * | 4/2005 | DiZoglio et al. ............. | 714/47 |
| 2005/0129035 A1 | 6/2005 | Saito | |
| 2005/0198337 A1 | 9/2005 | Sun et al. | |
| 2005/0229171 A1 * | 10/2005 | Henry et al. ................. | 717/168 |
| 2005/0240669 A1 | 10/2005 | Khanna et al. | |
| 2006/0259612 A1 | 11/2006 | De Oliveira et al. | |
| 2006/0280195 A1 * | 12/2006 | Lopez et al. ................ | 370/419 |
| 2007/0112962 A1 * | 5/2007 | Lewontin ................... | 709/227 |

OTHER PUBLICATIONS

Cisco Systems, White Paper, "Network Admission Control-Protecting the Network," 2005, pp. 1-6.
Intel Corp., Technology @ Intel Magazine, "Intel and Cisco Collaborate to Improve Enterprise Security," Sep. 2005, pp. 1-8.
Bluetooth; Bluetooth Specification Version 1.1; "Dial-Up Networking Profile," Feb. 22, 2001; 24 pages.
Bluetooth; Bluetooth SIG Version 1.0; "Personal Area Networking Profile;" Feb. 14, 2003; 65 pages.
Bluetooth; Bluetooth SIG Version 1.0; "Bluetooth Network Encapsulation Protocol (BNEP) Specification"; Feb. 14, 2003; 55 pages.

* cited by examiner

*Primary Examiner* — David Oveissi
(74) *Attorney, Agent, or Firm* — Christopher K. Gagne

(57) ABSTRACT

In an embodiment, a method is provided. The method of this embodiment provides receiving indication of an event at a platform operating in shared address mode, the platform having an auxiliary entity, in response to the indication of the event, switching operation of the platform to multi address mode by acquiring a second address, and assigning the second address to the auxiliary entity, and receiving one or more packets directed to the second address.

27 Claims, 3 Drawing Sheets

DYNAMIC NETWORK IDENTITY ARCHITECTURE

CROSS-REFERENCE TO RELATED APPLICATIONS

This application is a continuation of prior co-pending U.S. patent application Ser. No. 11/316,789 filed Dec. 22, 2005, entitled "Dynamic Network Identity Architecture."

FIELD

Embodiments of the invention relate to a dynamic network identity architecture.

BACKGROUND

Manageability refers to a computing platform's ("platform") ability to enable management of the platform, which may include, for example, system diagnostics, software updates, and/or system inventory. One way to achieve manageability is to use operating system-independent processors (hereinafter "service processors"). Service processors refer to auxiliary processors on a platform that may operate independently of the operating system ("OS").

Service processors enable out-of-band ("OOB") manageability. OOB manageability refers to management of a platform independently of the platform's operating system. OOB management may occur regardless of the system power or OS state, and may be used to provide remote platform information, diagnostics, debugging, updating, and control capabilities, for example. OOB manageability may occur, for example, when an OS is inoperable, or when a platform is powered off, although these conditions are not necessary for OOB manageability to operate. In contrast, in-band manageability refers to management of a platform using the platform's OS. In-band manageability may occur when the OS is operational.

OOB manageability may occur using shared address mode or multiple ("multi") address mode, such as dual address mode. In shared address mode, entities running on a platform may share a single address with the platform, such as an IP (Internet Protocol) address, where packets may be processed by an operating system. The Internet Protocol is described in the Internet Engineering Task Force (IETF) RFC 791, dated September 1981. In shared address mode, the platform may be identified by the single address such that there is no distinction between different types of traffic at the network layer. In other words, all traffic may be received at platform and processed by the operating system. Specific traffic types, such as OOB traffic (i.e., traffic to be processed by a service processor), may be identified by dedicated port numbers. In multi (e.g., dual) address mode, the service processor may have an address (e.g., IP address) unique from the platform. In this mode, the platform and another entity, such as the service processor, may be viewed as separate entities on the network by virtue of having different identities, and traffic may be distinguished using the addresses to which the packets are sent.

On the one hand, OOB traffic is better served in multi address mode because it provides a consistent network connection across all power states, OS states, and connection policies, for example. On the other hand, multi address mode may also increase network infrastructure overhead such as by duplicating the number of IP addresses that need to be supported.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1:
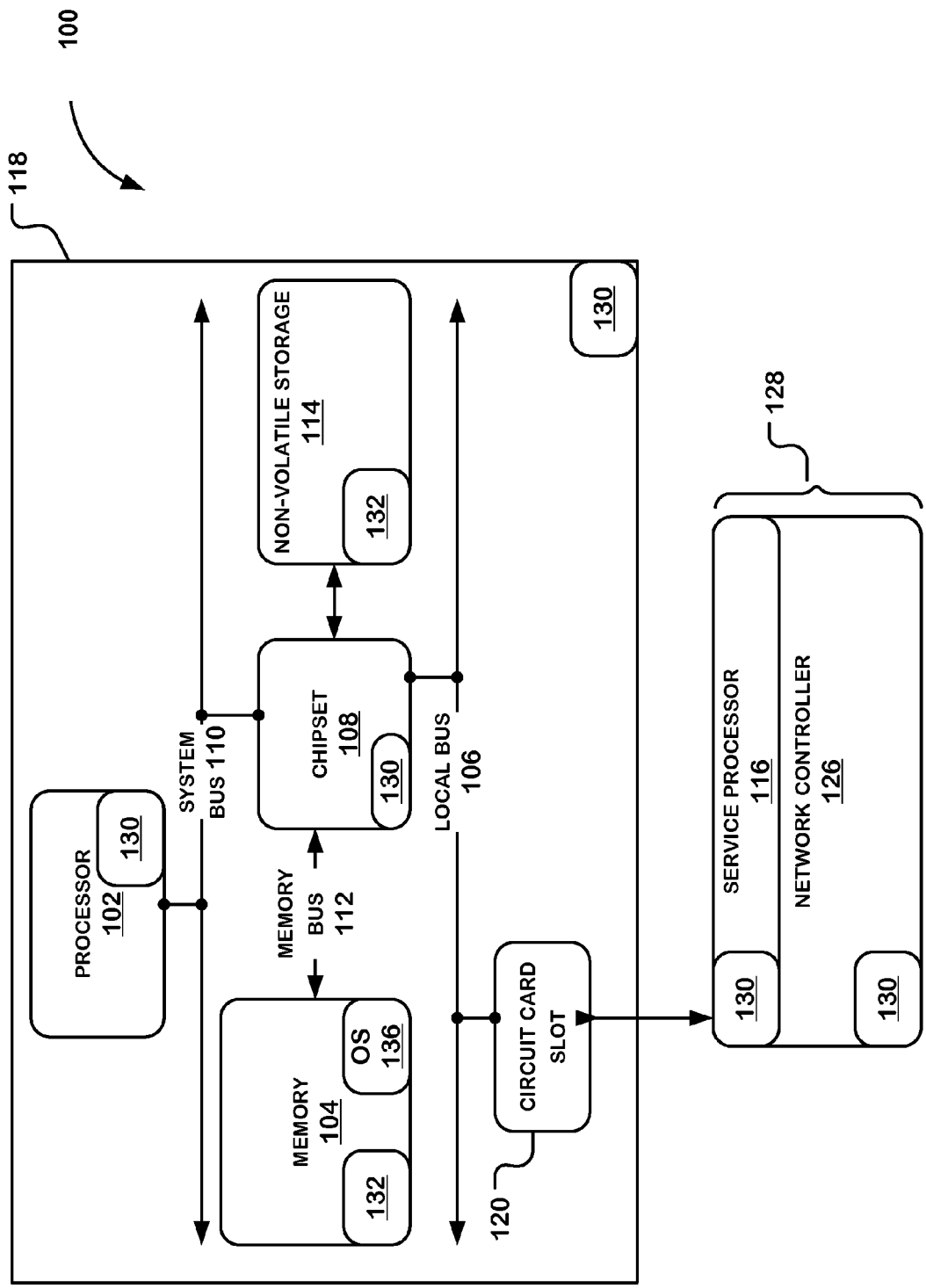
FIG. 1 illustrates a system embodiment.

As illustrated in FIG. 1, computing platform 100 may comprise processor 102. A "processor" as discussed herein relates to a combination of hardware and software resources for accomplishing computational tasks. For example, a processor may comprise a system memory and processing circuitry (e.g., a central processing unit (CPU) or microcontroller) to execute machine-readable instructions for processing data according to a predefined instruction set. Alternatively, a processor may comprise just the processing circuitry (e.g., CPU). Another example of a processor is a computational engine that may be comprised in a multi-core processor, for example, where the operating system may perceive the computational engine as a discrete processor with a full set of execution resources. Furthermore, processor 102 may be part of an SMP (symmetrical multi-processing) system, and may comprise, for example, an Intel® Pentium® processor, or an Intel® Xeon™ processor, both commercially available from Intel® Corporation. Of course, alternatively, processor 102 may comprise another type of processor, such as, for example, a microprocessor that is manufactured and/or commercially available from Intel® Corporation, or a source other than Intel® Corporation, without departing from embodiments of the invention. However, these are merely examples of processor and embodiments of the present invention are not limited in this respect.

Memory 104 may store machine-executable instructions 132 that are capable of being executed, and/or data capable of being accessed, operated upon, and/or manipulated by logic, such as logic 130. "Machine-executable" instructions as referred to herein relates to expressions which may be understood by one or more machines for performing one or more logical operations. For example, machine-executable instructions may comprise instructions which are interpretable by a processor compiler for executing one or more operations on one or more data objects. However, this is merely an example of machine-executable instructions and embodiments of the present invention are not limited in this respect. Memory 104 may, for example, comprise read only, mass storage, random access computer-accessible memory, and/or one or more other types of machine-accessible memories. The execution of program instructions 132 and/or the accessing, operation upon, and/or manipulation of this data by logic 130 for example, may result in, for example, computing platform 100 and/or logic 130 carrying out some or all of the operations described herein.

For example, memory 104 may store an operating system 136 (labeled "OS"). Operating system 136 may comprise host stack having one or more protocols to process packets. Furthermore, operating system 136 may request a Network Layer address by which platform 100 may be identified on a network. The Network Layer is part of the OSI (Open System Interconnection) networking model, which is part of the IEEE 802 LAN (local area network) standard. The OSI model is defined by the International Organization for Standardization (ISO) located at 1 rue de Varembé, Case postale 56 CH-1211 Geneva 20, Switzerland. The IEEE 802 standard is described in "IEEE Standards for local and metropolitan networks: overview and architecture", published December 1990. A Network Layer address may comprise, for example, an Internet Protocol ("IP") address.

An IP address may be statically assigned, for example, by a user or a system such as a configuration server. Alternatively, an IP address may be dynamically assigned. For example, operating system 136 may request an IP address from a configuration server, such as a DHCP (Dynamic Host Configuration Protocol) server, and the configuration server may assign the IP address to platform 100. Of course, other configuration protocol servers may be used to obtain an IP address.

Logic 130 may comprise hardware, software, or a combination of hardware and software (e.g., firmware). For example, logic 130 may comprise circuitry (i.e., one or more circuits), to perform operations described herein. Logic 130 may be hardwired to perform the one or more operations. For example, logic 130 may comprise one or more digital circuits, one or more analog circuits, one or more state machines, programmable logic, and/or one or more ASIC's (Application-Specific Integrated Circuits). Alternatively or additionally, logic 130 may be embodied in machine-executable instructions 132 stored in a memory, such as memory 104 or non-volatile memory 114, to perform these operations. Alternatively or additionally, logic 130 may be embodied in firmware. Logic may be comprised in various components of computing platform 100, including network controller 126, service processor 116, chipset 108, processor 102, and on motherboard 118. Logic 130 may be used to perform various functions by various components as described herein.

Chipset 108 may comprise a host bridge/hub system that may couple processor 102, and memory 104 to each other and to local bus 106. Chipset 108 may comprise one or more integrated circuit chips, such as those selected from integrated circuit chipsets commercially available from Intel® Corporation (e.g., graphics, memory, and I/O controller hub chipsets), although other one or more integrated circuit chips may also, or alternatively, be used. According to an embodiment, chipset 108 may comprise an input/output control hub (ICH), and a memory control hub (MCH), although embodiments of the invention are not limited by this. Chipset 108 may communicate with memory 104 via memory bus 112 and with processor 102 via system bus 110. In alternative embodiments, processor 102 and memory 104 may be coupled directly to bus 106, rather than via chipset 108.

Local bus 106 may be coupled to a circuit card slot 120 having a bus connector (not shown). Local bus 106 may comprise a bus that complies with the Peripheral Component Interconnect (PCI) Local Bus Specification, Revision 3.0, Feb. 3, 2004 available from the PCI Special Interest Group, Portland, Oreg., U.S.A. (hereinafter referred to as a "PCI bus"). Alternatively, for example, bus 106 may comprise a bus that complies with the PCI Express™ Base Specification, Revision 1.1, Mar. 28, 2005 also available from the PCI Special Interest Group (hereinafter referred to as a "PCI Express bus"). Bus 106 may comprise other types and configurations of bus systems.

Computing platform 100 may additionally comprise one or more network controllers 126 (only one shown). A "network controller" as referred to herein relates to a device which may be coupled to a communication medium to transmit data to and/or receive data from other devices coupled to the communication medium, i.e., to send and receive network traffic. For example, network controller 126 may transmit packets to and/or receive packets from devices coupled to a network such as a local area network. As used herein, a "packet" means a sequence of one or more symbols and/or values that may be encoded by one or more signals transmitted from at least one sender to at least one receiver. Such a network controller 126 may communicate with other devices according to any one of several data communication formats such as, for example, communication formats according to versions of IEEE (Institute of Electrical and Electronics Engineers) Std. 802.3, IEEE Std. 802.11, IEEE Std. 802.16, Universal Serial Bus, Firewire, asynchronous transfer mode (ATM), synchronous optical network (SONET) or synchronous digital hierarchy (SDH) standards. The IEEE specifications are available from IEEE Corporate Communications, 445 Hoes Lane, Piscataway, N.J., 08854.

Network controller 126 may comprise a DLC address that may be used to identify network controller 126. In an embodiment, data that is addressed to network controller 126 may be forwarded to and processed by operating system 136 hosted on processor 102. As used herein, "DLC address" refers to a Data Link Control address that may uniquely identify a hardware device on a network. For example, hardware device may comprise network controller 126. In an embodiment, a DLC address may comprise a MAC (Media Access Control) address that functions in the MAC layer, and that is defined in the OSI networking model. A DLC address may be assigned by the manufacturer of the hardware device. Alternatively, a DLC address may be assigned by a platform owner, such as an IT (Information Technology) Administrator.

In an embodiment, network controller 126 may be comprised on system motherboard 118. Rather than reside on motherboard 118, network controller 126 may be integrated onto chipset 108, or may instead be comprised in a circuit card 128 (e.g., NIC or network interface card) that may be inserted into circuit card slot 120. Circuit card slot 120 may comprise, for example, a PCI expansion slot that comprises a PCI bus connector (not shown). PCI bus connector (not shown) may be electrically and mechanically mated with a PCI bus connector (not shown) that is comprised in circuit card 128. Circuit card slot 120 and circuit card 128 may be constructed to permit circuit card 128 to be inserted into circuit card slot 120. When circuit card 128 is inserted into circuit card slot 120, PCI bus connectors (not shown) may become electrically and mechanically coupled to each other. When PCI bus connectors (not shown) are so coupled to each other, logic 130 in circuit card 128 may become electrically coupled to system bus 110.

In an embodiment, network controller 126 may be communicatively coupled to local bus 106. Rather than be communicatively coupled to local bus 106, network controller 126 may instead be communicatively coupled to a dedicated bus, for example, on the MCH of chipset 108. As used herein, components that are "communicatively coupled" means that the components may be capable of communicating with each other via wired (e.g., copper or optical wires), or wireless (e.g., radio frequency) means.

Platform 100 may additionally comprise service processor 116. Service processor 116 may comprise an embedded network stack to process packets. An embedded network stack is a network stack dedicated to service processor 116, and may process one or more packets addressed to service processor 110. In an embodiment, service processor 116 may be comprised in network controller 126. Alternatively, service processor 116 may be comprised in a chip. For example, service processor 116 may be comprised in an MCH chip that is embedded within chipset 108. However, embodiments are not limited in this respect, and other possibilities may exist. Service processor 116 may also comprise a DLC address. In an embodiment, service processor may share DLC address with network controller 126. Alternatively, service processor 116 and network controller 126 may each have its own DLC address.

Platform 100 may additionally comprise non-volatile storage 114. Non-volatile storage refers to a storage medium capable of maintaining expressions of information when power is removed from the storage medium. Non-volatile storage 114 may comprise, for example, writable optical media, magnetic media (e.g., hard disk memory) or semiconductor media (e.g., flash memory, EPROMs (Erasable Programmable Read Only Memory), or EEPROMs (Electrically Erasable Programmable Read Only Memory)). However, these are merely examples of a non-volatile storage 114 and embodiments of the present invention are not limited in this respect. In an embodiment, non-volatile storage 114 may store logic 130 used to perform methods described herein. Non-volatile storage 114 may additionally store machine-executable instructions 132. In an embodiment, service processor 116 may access machine-executable instructions 132 from non-volatile storage 114.

Computing platform 100 may comprise more than one, and other types of memories, buses, processors, and network controllers. For example, computing platform 100 may comprise a server having multiple processors 102 and multiple network controllers 126. Processor 102, memory 104, and busses 106, 110, 112 may be comprised in a single circuit board, such as, for example, a system motherboard 118, but embodiments of the invention are not limited in this respect.

Figure 2:
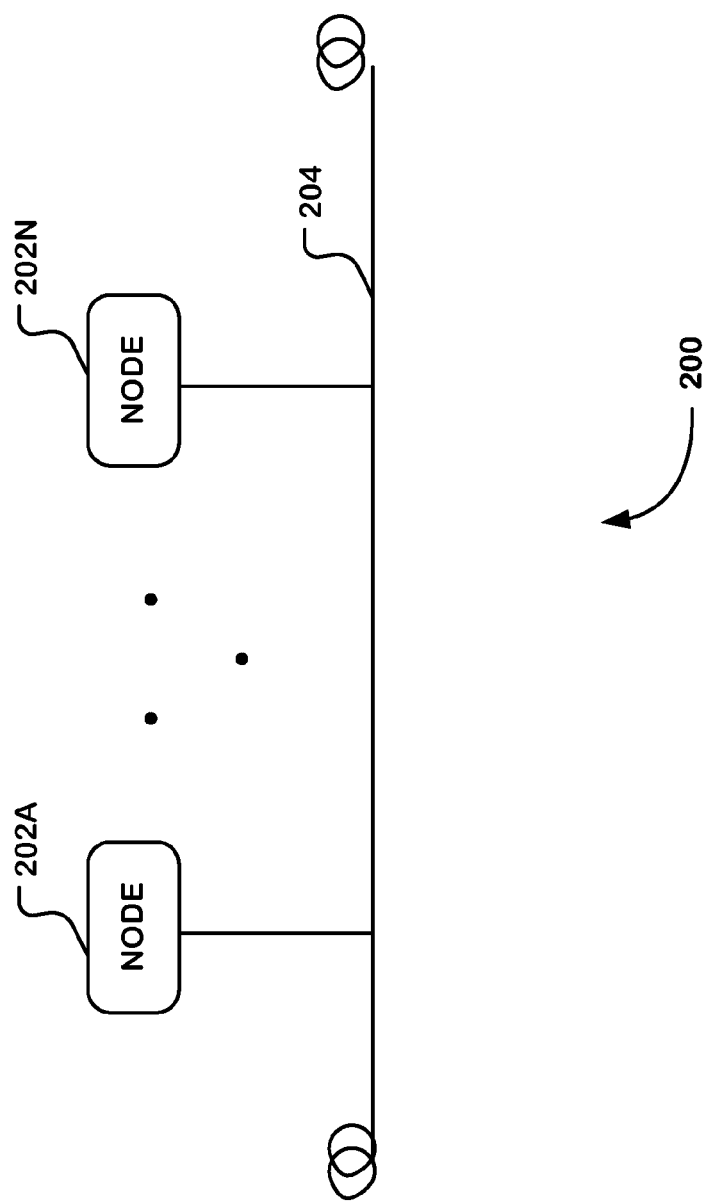
FIG. 2 illustrates a network embodiment.

As shown in FIG. 2, computing platform 100 may operate in a network 200. Network 200 may comprise at least one node 202A, . . . 202N, where at least one of nodes 202A, . . . , 202N may comprise computing platform 100. In an embodiment, one of nodes 202A, . . . , 202N may comprise a managed client, and another of nodes 202A, . . . , 202N may comprise a management server. "Managed client" as used herein refers to a computing node having assets and/or resources that may be managed. "Management server" as referred to herein refers to a computing node having management capabilities for managing a computing node, such as a managed client. Management capabilities may include, for example, tracking a computing node's assets, and performing remote functionalities, such as application updates and diagnostics.

Also, one or more of the nodes 202A . . . 202N may comprise one or more intermediate stations (not shown), such as, for example, one or more hubs, switches, and/or routers; additionally or alternatively, one or more of the nodes 202A . . . 202N may comprise one or more end stations.

Furthermore, nodes 202A, . . . , 202N may be communicatively coupled together via a communication medium 204. Communication medium 204 may communicatively couple together at least some of the nodes 202A . . . 202N and one or more of these intermediate stations. Of course, many alternatives are possible. Furthermore, nodes 202A . . . 202N may transmit and receive sets of one or more signals via communication medium 204 that may encode one or more packets.

Figure 3:
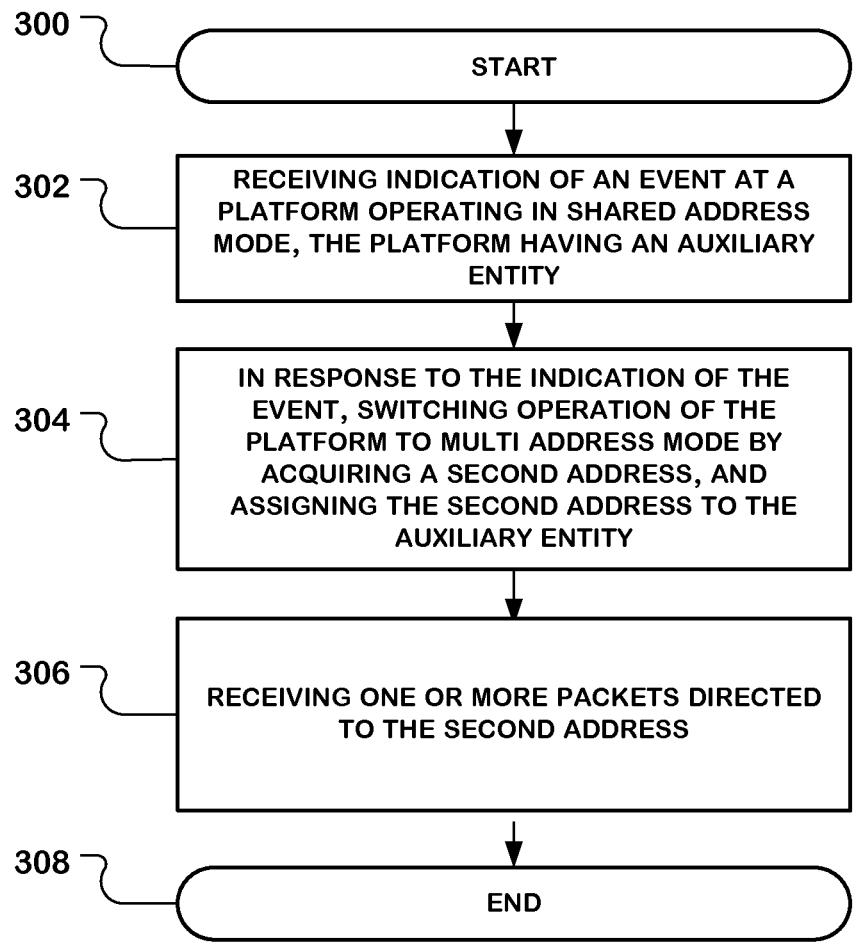
FIG. 3 is a flowchart that illustrates a method in one embodiment.

A method according to an embodiment is illustrated in FIG. 3. The method of FIG. 3 begins at block 300 and continues to block 302 where the method may comprise receiving indication of an event at a platform operating in shared address mode, the platform having an auxiliary entity.

Shared address mode refers to a mode of operation in which a platform may be identified by a single address. In shared address mode, entities, such as service processor 116, may share identity with platform 100. In other words, data sent to platform 100 while platform 100 operates in shared address mode may be handled by the host stack of operating system 136, and distinct traffic, such as OOB traffic, may be sorted out using dedicated port numbers (for example, port may comply with TCP (Transport Control Protocol) or UDP (User Datagram Protocol)). The single address may comprise a single IP address, where the IP address may be acquired from a DHCP server, for example.

As used herein, an "auxiliary entity" refers to a device, a processor, and/or a process on platform that may operate independently of the network controller on a platform. For example, platform 100 may comprise network controller 126 and service processor 116, where service processor 116 may operate independently of network controller 126. Furthermore, platform 100 may receive indication of an event, such as transmission of a network critical flow. In this embodiment, service processor 116, for example, may service the network critical flow, inter alia. Other examples of events include a BIOS (Basic Input/Output System) failure on the platform, or a programmed event, such as a system generated or user programmed schedule, where the programmed event may be a software upgrade, for example.

As used here, a "network critical flow" refers to a flow that may require a persistent network connection. Examples of operations requiring a persistent network connection include power state transition operations and operations in a NAC (Network Admission Control) environment A power state transition operation refers to a platform's 100 ability to execute the operating system. A platform may transition in accordance with the ACPI (Advanced Configuration and Power Interface) Specification, Rev. 3.0, dated Sep. 2, 2004. Under the ACPI Specification, a platform 100 can transition between power states S5, S4, S3, S2, S1, and S0. S0 refers to the running state where the platform 100 is fully powered. S3 refers to a suspend state where only the DRAM and selected peripherals are powered. S4 refers to the hibernate state, and S5 refers to the shutdown state. S1 and S2 refer to intermediate states. During a power state transition, if a platform transitions to a lower power state, the platform's operating system typically notifies the network that it is no longer present. For certain processes, such as manageability flows, system reboot may also be necessary, resulting in operating system 136 status fluctuations. In this type of environment the use of separate network identities (e.g., IP address) for separate processes (e.g., operating system 136 and service processor 116) may reduce conflicts that may arise.

A NAC network refers to an environment in which security policy compliance on a network may be enforced. NAC is a Cisco Systems, Inc. co-sponsored industry initiative that uses a network infrastructure to enforce security policy compliance on devices seeking to access network computing resources in an effort to limit damage from viruses and worms. NAC is described in, for example, a white paper entitled "Network Admission Control—Protecting the Network", dated 2005, by Cisco Systems, Inc. Having multi-mode MAC in a NAC environment means that each entity (e.g., operating system and service processor 116) may connect to the NAC-enabled environment as a unique entity. The enables the NAC-enabled network to distinguish between the two processes. For example, if operating system 136 is not in a trusted state, the NAC-enabled network may keep operating system 136 off the network while allowing service processor 116 to connect.

In an embodiment, the indication may comprise a signal. The signal may be sent over a network from another platform, and may indicate an event. Furthermore, the signal may be addressed to the address used in shared address mode. For example, the signal may comprise a packet having a request to switch to multi address mode, or having data that is part of a network critical flow, where the data may be recognized and/or flagged as network critical flow data. As another example, the signal may comprise a Web based message protocol that may indicate subsequent transmission of or comprise network critical flow.

At block 304, the method may comprise in response to the indication of the event, switching operation of the platform to multi address mode by acquiring a second address, and assigning the second address to the auxiliary entity. For example, platform 100 may switch to multi address mode by acquiring a second address, and assigning the second address to service processor 116.

Multi address mode refers to a mode of operation in which the platform and another entity on the platform may be viewed as separate entities on the network by virtue of having separate addresses. In an embodiment, for example, a dual address mode may be used, where the platform (i.e., network controller 126) may be assigned a first address, and the service processor may be assigned a second address. As another example, one address may identify one virtual network (such as a network that only accepts manageability related traffic), and a second address may identify another virtual network (such as a network that accepts all other traffic on the traffic). Both IP addresses may be acquired from a DHCP server, for example.

As briefly discussed above, network controller 126 and service processor 116 may share a single DLC (e.g., MAC) address, or may each have its own DLC (e.g., MAC) address. In shared address mode, each entity (e.g., service processor 116 and network controller 126) may use the shared MAC address and some additional data to request an IP address, such as from a DHCP server, to establish unique identity to the server. In multi address mode, each entity (e.g., service processor 116 and network controller 126) may use its own MAC to request an IP address, such as from a DHCP server, where the unique MAC may establish unique identity to the server.

In an embodiment, the first address (assigned to network controller 126) may be used to receive normal flow (that is processed by host stack of operating system 136), and the second address (acquired for multi address mode and assigned to service processor 116) may be used to receive another type of flow (that is processed by embedded network stack dedicated to service processor 116). For example, the other type of flow may comprise a network critical flow.

At block 306, the method may comprise receiving one or more packets directed to the second address. During this time, platform 100 may be rebooted, or disconnected from the network, and/or operating system 136 may not be functional, without affecting ability of service processor 116 to receive flows sent to service processor 116.

In an embodiment, the operation at block 306 may be in response to first receiving an indication that the platform 100 has switched to multi address mode. Indication that the platform 100 has switched to multi address mode may comprise service processor 116 establishing a connection to the network as a separate entity. For example, in a wired environment, service processor 116 can start a session with a DHCP server. Alternatively, in a wireless environment, service processor 116 may establish itself as an access point. An access point refers to an interface between a wired and a wireless network. An access point may be established in accordance with the IEEE 802.11 family of specifications. As another example, a remote server may detect transition to multi address mode by engaging in discovery methods.

Upon signal of completion of the need to operate in multi address mode, the second address that was acquired when platform 100 transitioned to multi address mode may be relinquished. For example, service processor 116 may specify its unique identity to DHCP server, and DHCP server may release the IP address. Signal of completion may comprise, for example, complete transmission of a network critical flow.

The method may end at block 308.

Therefore, in an embodiment, a method may comprise receiving indication of an event at a platform operating in shared address mode, the platform having a network controller and an auxiliary entity, in response to the indication of the event, switching operation of the platform to multi address mode by acquiring a second address, and assigning the second address to the auxiliary entity, and receiving one or more packets directed to the second address.

Embodiments of the invention may provide a platform that may be accessed in one of two modes: shared address mode or multi address mode. The availability of the two modes provides a simplified network infrastructure for operations that occur more frequently, and an efficient network infrastructure for operations that need the persistent network connection, and that may occur less frequently.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. An apparatus comprising:
 a computing platform having one mode of operation and another mode of operation, the platform including non-volatile flash memory storage to store machine-executable instructions that when executed result in the platform switching from the another mode to the one mode;
 in the one mode of operation:
   the computing platform to include a first entity and a second entity;
   the first entity to be wirelessly communicatively coupled via a first network and to be identified by a first wireless communication address so as to receive a first flow via the first network;
   the second entity to be wirelessly communicatively coupled via a second network and to be identified by a second wireless communication address in the second network so as to receive a second flow via the second network; and
 after transitioning from the one mode to the another mode of operation:
   the second address has been relinquished;
 wherein:
   the first flow is to be processed by a first network stack; and
   the second flow is to be processed by a second network stack that is independent of the first network stack.

2. The apparatus of claim 1, wherein:
in the another mode of operation, the first entity and the second entity are to share a common address of the platform for communication via the first network.

3. The apparatus of claim 1, wherein:
in the another mode of operation, the second entity is not to communicate via the second network using the second address.

4. The apparatus of claim 1, wherein:
the first flow is security related and is to be communicated via a persistent network connection.

5. The apparatus of claim 1, wherein:
the first entity is comprised in a chipset in the platform.

6. The apparatus of claim 1, wherein:
the first entity is comprised in a network controller in the platform.

7. The apparatus of claim 1, wherein:
in the one mode, the platform is identified by the second address in the second network.

8. The apparatus of claim 1, wherein:
the second network is to use a data communication format that is according to an Institute of Electrical and Electronics Engineers Std. 802.11 standard.

9. The apparatus of claim 1, wherein:
the second address comprises an internet protocol address.

10. A method comprising:
operating a computing platform that has one mode of operation and another mode of operation, the platform including non-volatile flash memory storage to store machine-executable instructions that when executed result in the platform switching from the another mode to the one mode;
in the one mode of operation:
 the computing platform to include a first entity and a second entity;
 the first entity to be wirelessly communicatively coupled via a first network and to be identified by a first wireless communication address so as to receive a first flow via the first network;
 the second entity to be wirelessly communicatively coupled via a second network and to be identified by a second wireless communication address in the second network so as to receive a second flow via the second network; and
after transitioning from the one mode to the another mode of operation:
 the second address has been relinquished;
wherein:
 the first flow is to be processed by a first network stack; and
 the second flow is to be processed by a second network stack that is independent of the first network stack.

11. The method of claim 10, wherein:
in the another mode of operation, the first entity and the second entity are to share a common address of the platform for communication via the first network.

12. The method of claim 10, wherein:
in the another mode of operation, the second entity is not to communicate via the second network using the second address.

13. The method of claim 10, wherein:
the first flow is security related and is to be communicated via a persistent network connection.

14. The method of claim 10, wherein:
the first entity is comprised in a chipset in the platform.

15. The method of claim 10, wherein:
the first entity is comprised in a network controller in the platform.

16. The method of claim 10, wherein:
in the one mode, the platform is identified by the second address in the second network.

17. The method of claim 10, wherein:
the second network is to use a data communication format that is according to an Institute of Electrical and Electronic Engineers Std. 802.11 standard.

18. The method of claim 10, wherein:
the second address comprises an internet protocol address.

19. Non-transitional Machine-readable tangible memory storing machine-accessible instructions that when executed by a machine result in performance of operations comprising:
operating a computing platform that has one mode of operation and another mode of operation, the platform including non-volatile flash memory storage to store certain machine-executable instructions that when executed result in the platform switching from the another mode to the one mode;
in the one mode of operation:
the computing platform to include a first entity and a second entity;
the first entity to be wirelessly communicatively coupled via a first network and to be identified by a first wireless communication address so as to receive a first flow via the first network;
the second entity to be wirelessly communicatively coupled via a second network and to be identified by a second wireless communication address in the second network so as to receive a second flow via the second network; and
after transitioning from the one mode to the another mode of operation:
the second address has been relinquished;
wherein:
the first flow is to be processed by a first network stack; and
the second flow is to be processed by a second network stack that is independent of the first network stack.

20. The memory of claim 19, wherein:
in the another mode of operation, the first entity and the second entity are to share a common address of the platform for communication via the first network.

21. The memory of claim 19, wherein:
in the another mode of operation, the second entity is not to communicate via the second network using the second address.

22. The memory of claim 19, wherein:
the first flow is security related and is to be communicated via a persistent network connection.

23. The memory of claim 19, wherein:
the first entity is comprised in a chipset in the platform.

24. The memory of claim 19, wherein:
the first entity is comprised in a network controller in the platform.

25. The memory of claim 19, wherein:
in the one mode, the platform is identified by the second address in the second network.

26. The memory of claim 19, wherein:
the second network is to use a data communication format that is according to an Institute of Electrical and Electronics Engineers Std. 802.11 standard.

27. The memory of claim 19, wherein:
the second address comprises an internet protocol address.

* * * * *

UNITED STATES PATENT AND TRADEMARK OFFICE
CERTIFICATE OF CORRECTION

PATENT NO. : 8,902,906 B2
APPLICATION NO. : 13/346181
DATED : December 2, 2014
INVENTOR(S) : Avigdor Eldar et al.

Page 1 of 1

It is certified that error appears in the above-identified patent and that said Letters Patent is hereby corrected as shown below:

In the Claims,

In column 10, line 13, in Claim 19, delete "Machine-readable" and insert -- machine-readable --, therefor.

Signed and Sealed this
Thirtieth Day of June, 2015

Michelle K. Lee
*Director of the United States Patent and Trademark Office*